US008289185B2

(12) United States Patent
Alonso

(10) Patent No.: US 8,289,185 B2
(45) Date of Patent: Oct. 16, 2012

(54) SPORTS TELEMETRY SYSTEM FOR COLLECTING PERFORMANCE METRICS AND DATA

(75) Inventor: Ramon A. Alonso, Miami, FL (US)

(73) Assignee: Advanced Technologies Group, LLC, Miami, FL (US)

( * ) Notice: Subject to any disclaimer, the term of this patent is extended or adjusted under 35 U.S.C. 154(b) by 346 days.

(21) Appl. No.: 12/772,599

(22) Filed: May 3, 2010

(65) Prior Publication Data

US 2010/0283630 A1 Nov. 11, 2010

Related U.S. Application Data

(60) Provisional application No. 61/237,499, filed on Aug. 27, 2009, provisional application No. 61/175,497, filed on May 5, 2009.

(51) Int. Cl.
*G08C 19/04* (2006.01)

(52) U.S. Cl. .................... 340/870.11; 702/187

(58) Field of Classification Search ............. 340/870.11; 702/187; 342/127, 118, 418, 428; 701/213; 600/315, 595
See application file for complete search history.

(56) References Cited

U.S. PATENT DOCUMENTS

2003/0163287 A1\* 8/2003 Vock et al. .................... 702/187

\* cited by examiner

*Primary Examiner* — Joseph Lauture
(74) *Attorney, Agent, or Firm* — Feldman Gale, P.A.; Rafael Perez-Pineiro

(57) ABSTRACT

Systems and methods for collecting sports data are disclosed, which include measuring, at one or more sensor modules mounted, affixed, or embedded on at least one sports participant, data corresponding to identification, movement, position, or condition of the at least one sports participant; broadcasting, from one or more telemetry modules mounted, affixed, or embedded on the at least one sports participant, signals carrying the data corresponding to identification, movement, position, or condition of the at least one sports participant; measuring, at one or more sensor modules mounted, affixed, or embedded in a sports object, data corresponding to identification, movement, position, or condition of the sports object; and broadcasting, from one or more telemetry modules mounted, affixed, or embedded on the sports object, signals carrying the data corresponding to identification, movement, position, or condition of the sports object. The systems and methods also include receiving the signals from the telemetry modules mounted, affixed, or embedded on the at least one sports participant and the telemetry modules mounted, affixed, or embedded on the sports object; and processing the received signals to calculate position information or movement information of a sports object or a sports participant in relation to a playing surface of a sports event.

34 Claims, 17 Drawing Sheets

| QB Stats & Telemetry (Per Play) | | | | | | Passing | | | | | | | Fumbles | | | Rushing | |
|---|---|---|---|---|---|---|---|---|---|---|---|---|---|---|---|---|---|
| Play | Attempt | Comp. | Dist. (Yards) | TD | Int. | Ball Speed (MPH) | Ball Spin (RPM) | Pass Elevation (Feet) | Ball Angle (Degrees) | Sacks | Sack Impact (G Force) | Vertical Leap (Inches) | FUM | Lost FUM | Rush | Total Yards | Dist. (Yards) |
| 1 | 1 | 1 | 35.931 | 0 | 0 | 47.8 | 129 | 37.9 | 8.1 | 1 | 3.74 | | 0 | 0 | | 12,113 | 10,131 |
| 2 | 0 | 0 | 0.000 | 0 | 0 | 0.000 | 0.000 | 0.000 | 0.000 | 0 | 0.000 | 0.000 | | | 1 | | |
| 3 | | | | | | | | | | | | | | | | | |

Continued To 8B

| Legend | |
|---|---|
| xx | Traditional Stats |
| xx | Traditional Stats Enhanced with Sports Traxx System |
| xx | Telemetry Stats using Sports Traxx System |

FIG. 8A

FIG. 8B (Continued From 8A, Continued To 8C)

| TD | Rushing Speed (MPH) | Top Burst Speed (MPH) | Blocking Impact (G-Force) | Tackled Impact (G-Force) | Vertical Leap (Inches) | FUM | Lost FUM | Start of Play — Player Location Longitude | Start of Play — Player Location Latitude | Current Play | Bio Stats Bio-Heart (BPM) | Bio Stats Bio-Temp (F°) | Player Location Longitude | Player Location Latitude |
|---|---|---|---|---|---|---|---|---|---|---|---|---|---|---|
| 0 | 17.83 | 19.13 | 2.1 | 3.2 | 11.36 | 1 | 0 | 80°14'20" | 25°57'29" |  | 92 | 99.3 | 80°19'20" | 25°58'15" |
|  |  |  |  |  |  |  |  | 80°33'15" | 25°6'35" |  | 93 | 99.4 | 80°53'1" | 25°63'25" |

FIG. 8C (Continued From 8B)

| End of Play — Player Location Longitude | End of Play — Player Location Latitude | BIO Stats Bio-Heart (BPM) | BIO Stats Bio-Temp (F°) | BIO Stats Bio-Heart (BPM) | BIO Stats Bio-Temp (F°) |
|---|---|---|---|---|---|
| 80°33'15" | 25°6'35" | 96 | 99.4 | 99 | 99.5 |
| 80°63'15" | 25°8'24" | 97 | 99.5 | 100 | 99.8 |

| WR Stats & Telemetry (Per Play) | | | | | | | | | | | | | | | Continued To 9B |
|---|---|---|---|---|---|---|---|---|---|---|---|---|---|---|---|
| | | | Receiving | | | | Fumbles | | Rushing | | | | | | |
| Play | Rec. | Dist. (Yards) | TD | Receiving Speed (MPH) | Top Burst Speed (MPH) | Blocking Impact (G-Force) | Tackled Impact (G-Force) | Vertical Leap (Inches) | FUM | Lost FUM | Rush | Dist. (Yards) | TD | Rushing Speed (MPH) | Top Burst Speed (MPH) | Blocking Impact (G-Force) | Tackled Impact (G-Force) |
| 1 | 1 | 55.79 | 1 | 19.1 | 21.1 | 0.00 | 3.90 | 17.35 | 0 | 0 | | | | | | | |
| 2 | | | | | | | | | | | 1 | 3.912 | 0 | 16.3 | 19.3 | 2.1 | 0.00 |

| Legend | |
|---|---|
| xx | Traditional Stats |
| xx | Traditional Stats Enhanced with Sports Traxx System |
| xx | Telemetry Stats using Sports Traxx System |

FIG. 9A

FIG. 9B (Continued From 9A / Continued To 9C)

| Fumbles | | | Start of Play | Player Location | | Bio Stats | | Current Play | Player Location | | BIO Stats | | End of Play |
|---|---|---|---|---|---|---|---|---|---|---|---|---|---|
| Vertical Leap (Inches) | FUM | Lost FUM | | Longitude | Latitude | Bio-Heart (BPM) | Bio-Temp (F°) | | Longitude | Latitude | Bio-Heart (BPM) | Bio-Temp (F°) | |
| 17.35 | 0 | 0 | | 80°14'20" | 25°57'29" | 92 | 99.3 | | 80°19'20" | 25°58'15" | 96 | 99.4 | |
| | | | | 80°33'15" | 25°67'35" | 93 | 99.4 | | 80°53'1" | 25°63'25" | 97 | 99.5 | |

FIG. 9C (Continued From 8B)

| Player Location | | BIO Stats | |
|---|---|---|---|
| Longitude | Latitude | Bio-Heart (BPM) | Bio-Temp (F°) |
| 80°33'15" | 25°67'35" | 99 | 99.5 |
| 80°63'15" | 25°8'24" | 100 | 99.8 |

FIG. 10A

Defensive Player Stats & Telemetry (WEEKLY...Per Game)

| Week | Tackles | Solos | Asst. | Sacks | Safety | Tackles — Avg. Tackle Speed (MPH) | Tackles — Avg. Top Burst Speed (MPH) | Tackles — Avg. Tackled Impact (G-Force) | Tackles — Avg. Vertical Leap (Inches) | Fumbles — FUM | Fumbles — Lost FUM | PDef | Interceptions — Int | Interceptions — Yds | Interceptions — Avg. | Interceptions — Long | Interceptions — TD | Interceptions — Avg. Run Speed (MPH) | Interceptions — Top Burst Speed (MPH) | Interceptions — Avg. Blocking Impact (G-Force) | Interceptions — Avg. Tackled Impact (G-Force) | Interceptions — Avg. Vertical Leap (Inches) | Continued To 10B |
|---|---|---|---|---|---|---|---|---|---|---|---|---|---|---|---|---|---|---|---|---|---|---|---|
| 1 | 27 | 7 | 10 | 1 | 1 | 19.18 | 21.14 | 3.9 | 12.3 | 0 | 0 | 30 | 2 | 2 | 3.9 | 7.8 | 0 | 16.31 | 19.37 | 0 | 3.1 | 17.35 | |
| 2 | | | | | | | | | | | | | | | | | | | | | | | |

Legend

| | |
|---|---|
| xx | Traditional Stats |
| xx | Traditional Stats Enhanced with Sports Traxx System |
| xx | Telemetry Stats using Sports Traxx System |

FIG. 10B

| Continued From 10A | Fumbles — FUM | Fumbles — Lost FUM | Start of Play — Bio Stats — Bio-Heart (BPM) | Start of Play — Bio Stats — Bio-Temp (F°) | Current Play — Bio Stats — Bio-Heart (BPM) | Current Play — Bio Stats — Bio-Temp (F°) | End of Play — BIO Stats — Bio-Heart (BPM) | End of Play — BIO Stats — Bio-Temp (F°) |
|---|---|---|---|---|---|---|---|---|
| | | | 92 | 99.3 | 96 | 99.4 | 99 | 99.5 |
| | | | 93 | 99.4 | 97 | 99.5 | 100 | 99.8 |

| Current Down | Scrimmage Line Marker | Field Location | | First Down Marker | Field Location | | Current Location Marker | Field Location | |
|---|---|---|---|---|---|---|---|---|---|
| | | Longitude | Latitude | | Longitude | Latitude | | Longitude | Latitude |
| 1st | 16.6 | 80°14'20" | 25°57'29" | Goal Line | 81°31'11" | 25°45'19" | 16.6 | 80°14'20" | 25°57'29" |
| 2nd | | | | | | | | | |
| 3rd | | | | | | | | | |
| 4th | | | | | | | | | |

| Legend | |
|---|---|
| xx | Traditional Stats |
| xx | Traditional Stats Enhanced with Sports Traxx System |
| xx | Telemetry Stats using Sports Traxx System |

FIG. 12

SPORTS TELEMETRY SYSTEM FOR COLLECTING PERFORMANCE METRICS AND DATA

CROSS-REFERENCE TO RELATED APPLICATION

This application claims the benefit of U.S. Provisional Application No. 61/175,497, filed on May 5, 2009, and U.S. Provisional Application No. 61/237,499, filed on Aug. 27, 2009, the entireties of which are incorporated herein by reference.

FIELD OF THE INVENTION

The present invention generally relates to methods and systems for collecting performance data during sports events or practice sessions. More particularly, the present invention may be embodied as an electronic ecosystem of different technologies related to telemetry and analysis of performance metrics and data.

BACKGROUND OF THE INVENTION

The gathering, processing, and use of data and statistics are an important aspect of the business, analysis and appreciation of sports. Amateur and professional teams, coaches, and fans record and evaluate data and statistics for comparing the performance of teams and individual athletes. Teams, coaches, scouts, agents, and fans also review data, video, and statistics to analyze athletic performance and ability thereby enhancing the appreciation of the player's athletic accomplishments. Teams and coaches use data, video, and statistics to evaluate present and potential athletes, and their performances. They also plan game strategies based upon opponents' athletic abilities and performance data and statistics.

Advancements in technology and computerized data processing have developed modeling software, applications, and websites which, with the input of detailed statistical data, may track and/or predict the sequence of interactions forming a virtual sporting event from actual sporting events and essentially produce an artificial or simulated athletic competition.

The term "Fantasy Sports" has been used to identify the process of using sports modeling software, applications and statistical data to virtually assemble teams of selected athletes and operate the computer to predict the sequence of interactions forming an athletic competition between fans and their teams. Computer modeling of sports events has become a popular leisure and fan activity which has evolved into an important commercial sector of the sports business.

Potential player scouting and drafting continues to be a critical component of a team's future. College and professional sports invest great resources, time and money into reviewing prospective athletes. The scouts obtain and evaluate the athlete's capabilities, including speed, movement, skills, and agility. In addition to the player's previous game history, professional sports invest in major events such as the National Football League (NFL) Combine, "Pro Days" and private practices as a means for evaluating specific players and potential performance. Other information is gathered via review of countless hours of game video, player data and statistics, and the like.

The prior art methods for collecting sports data, performance metrics, and creating statistics have their drawbacks. For example, much of the data is entered manually. Also, non-real-time video review for purposes of collecting and analyzing performance data is not efficient. Subjective and measured information is gathered via review of countless hours of game video, player data and statistics, and the like. Acquiring objective and quantifying sports RTLS/RTSS performance metrics, data and statistics of a player's game, practice, training and/or sporting event performances from High School, College, through the professional level is a very important and valuable asset for the player, teams, coaches, team owner, fans, sports telecasts and the sports industry as a whole.

Therefore, there is a need in the art for a more efficient system and method for gathering comprehensive sports data in real-time and in automated fashion.

The present invention solves the problems in the prior art by enabling the real-time acquisition, recording, transmittal, and processing of actual game, practice, training and/or sporting event sports performance metrics, tracking, location, speed, impact and data from sports players, field and sports objects (balls, bats, equipment, etc.), game officials (referees) and the "Field of Play" using, for example, RTLS/RTSS telemetry with RF technology and video technology, which may be used to superimpose acquired performance metrics and data on video, for example.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention includes systems and methods for acquiring, collecting exporting and delivering sports performance metrics and data from individual sports participants, entire sports teams, sports officials (referees), field of play and sports objects, during actual sporting events/games and/or practice events to objectively quantify, evaluate, and analyze player and team performances. The data may be collected and relayed to a base computer system for further analysis through the use of an RTLS/RTSS RF system. The data may include player and referee biological data such as heart rate and body temperature. The systems and methods may include fixing sensor modules and telemetry modules on sports participants, apparel or their sports equipment and in sports and field objects.

In some embodiments, the telemetry module may use ultra-wideband ("UWB") radio technology to communicate with base receivers by implementing the IEEE 802.15 or Zigbee specifications; or may use other RF technologies to communicate with the base receivers by implementing IEEE 802.11, for example. Alternatively, the telemetry module may use more conventional RF tags and/or surface acoustic wave ("SAW") tag technologies for purposes of communication with base receivers.

The sensor modules, also part of the RTLS/RTSS of the present invention, may be incorporated into the telemetry modules in some embodiments. Alternatively, the sensor modules, may also be deployed as separate devices which connect with the telemetry modules through a wireless or wired link. The sensors and/or tags may communicate with each other (tag-to-tag) and/or directly to the receiving devices.

At least one base receiving module may wirelessly receive the telemetry data obtained from the telemetry modules and forwards the collected data to a base computer system. Base receiving modules may forward to the base computer the Sports RTLS/RTSS RF performance metrics data via a wired or wireless network or through a direct wired connection. The base computer system may be programmed and configured for receiving, storing, processing, and exporting processed data over a network, for example, to reach end users.

The sensor modules and the telemetry modules may be operated to acquire, collect, store, export and deliver the data to the base receiving modules. The base computer may be operated to receive, store, process and export the data for providing actual performance metrics, data and statistical information relating to location based tracking, speed, burst, impact, movement, relative position, and conditions of individual sports participants, and/or the entire teams, field of play and/or sports objects in Real-Time.

It is an object of the present invention to provide a method for acquiring, collecting, communicating, processing, recording and/or exporting actual sports players and teams performance metrics, data and statistics during actual sporting events in Real-time for objective, analysis and evaluations, and/or comparisons which would be of benefit to the Sports and Entertainment community.

A second object of the present invention is to provide systems and methods that use any form of RTLS/RTSS for acquiring, gathering, recording and exporting actual Real-time training, game and/or practice, sporting event performance metrics, data and statistics from sports players (embedded within, attached, or affixed to player equipment, apparel, cleats, shoes, helmet, shoulder pads, protective equipment like thigh and knee pad., gloves, etc.), game objects (balls), sports objects (embedded within, attached, affixed to goal posts, yard sticks, yard markers, other field of play equipment, etc.), game officials/referees (embedded within, attached, or affixed to referee equipment, apparel, cleats, shoes, helmet, shoulder pads, protective equipment, etc.), the actual "Field of Play" itself, sports components and practice equipment (tackling dummies, Blocking Sleds, Hitting pads, and the like), and others, using various RF and sensing devices for information and/or data in conjunction with RTLS/TSS and RF wireless technology and systems.

A further object of the present invention is to provide a method for acquiring, collecting, exporting, recording, analyzing and communicating performance metrics and data from an individual sports participants and teams during an actual sporting event, game, practice, training or other sports referenced event.

A further object of the present invention is to provide a method for acquiring, collecting, exporting, recording, analyzing and communicating performance metrics and data from sports participants and/or game officials (referees) of an entire team and/or teams, during an actual sporting event, game, practice, training or other sports referenced event.

It is yet another object of the present invention to provide a method for acquiring, collecting, exporting, recording, analyzing and communicating performance metrics and data from sports objects and field of play, during an actual sporting event, game, practice, training or other sports referenced event.

Another object is to provide a three-dimensional telemetry collection system, including longitudinal, lateral, and height dimensions for an x-y-z spatial representation, enabling a 360° degree spatial representation of the performance metrics, data and statistics.

It is yet another object of the present invention to synchronize real-time footage of a sporting event with the received telemetry data, allowing the acquired performance metrics, data, and statistics to be superimposed on video telecast and transmissions, if and when desired.

A further object is to instantly acquire every active sports players' Real-Time performance metrics, data and statistics such as player location, tracking, movement, speed, velocity, speed burst, impact (G-Force), distance traveled, forward, backward, horizontal and vertical movements, vertical leap or jumps, biological information like heart rate and body temperature, in the "Field of Play" location, and overall athletic and game official (referees) performances.

It is another object to superimpose and/or integrate Real-time performance metrics, data and statistics onto the live video telecast or instant replays and to superimpose the performance metrics, data and statistics for use on game film for video film study.

It is another object to provide Real-time 360° rendition of performance metrics, data and statistical perspectives.

It is another object to provide a planar (2D) and a spatial (3D) coordinate position for performance metrics, data and statistics acquisition, collection, processing, exportation and recordings, and to display the processed information in a 360° performance view to assist in the training of athletes and provide additional insights to players, coaches, scouts, and fans.

Thus, the present invention offers comprehensive and multi-functional elements for acquiring actual game performance metrics and data from athletes in real-time.

These and other objects, features and advantages of the present invention will become more readily apparent from the attached drawings and detailed description of the preferred embodiments, which follow.

It is another object to allow the user to electronically download game performance metrics and data for use with video game consoles.

The invention will be further understood, by way of example, with reference to the accompanying drawings, in which.

Figure 13:
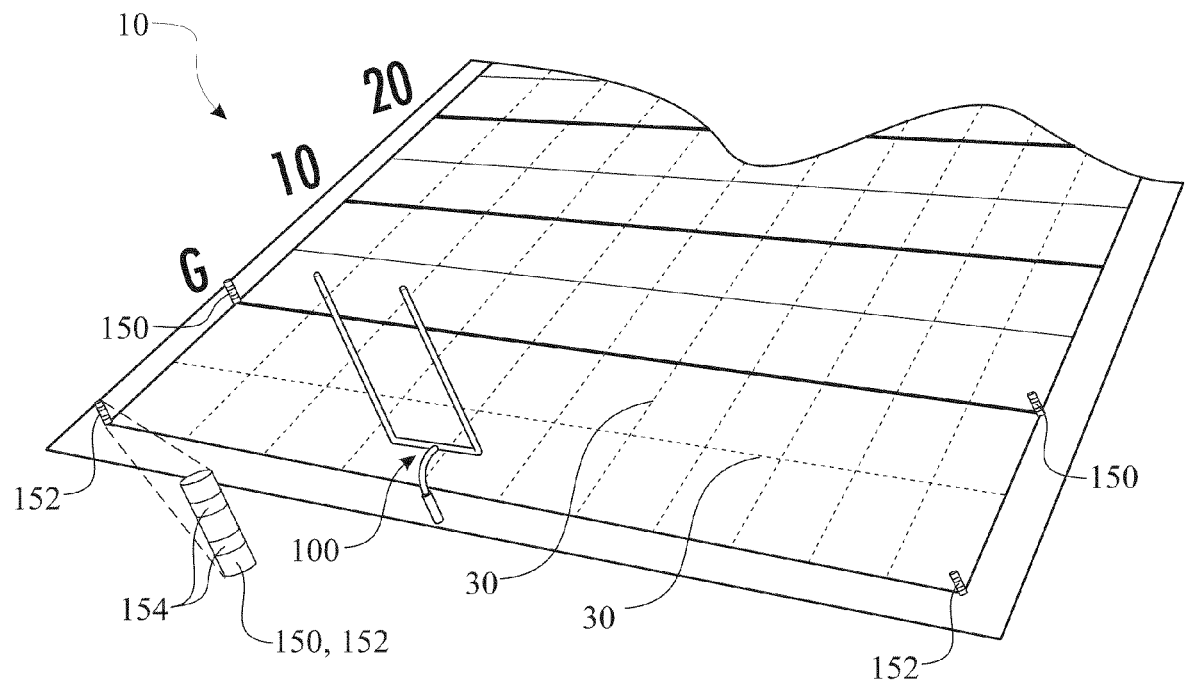
Figure 14:
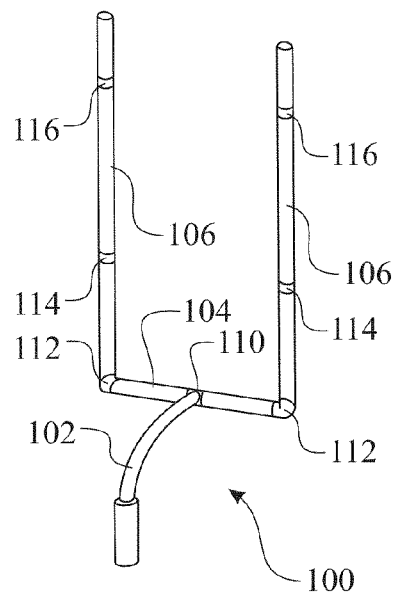
Figure 15:
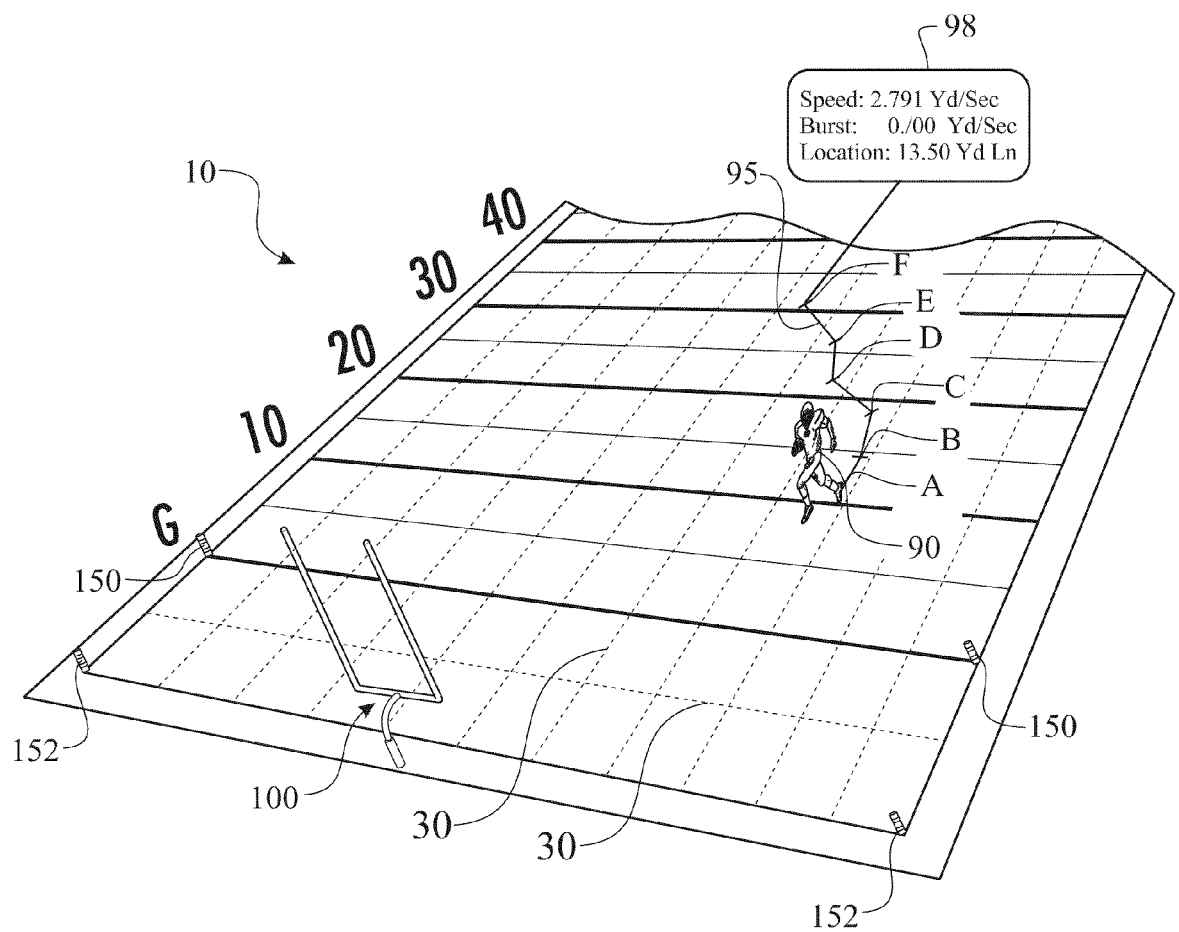
Figure 16:
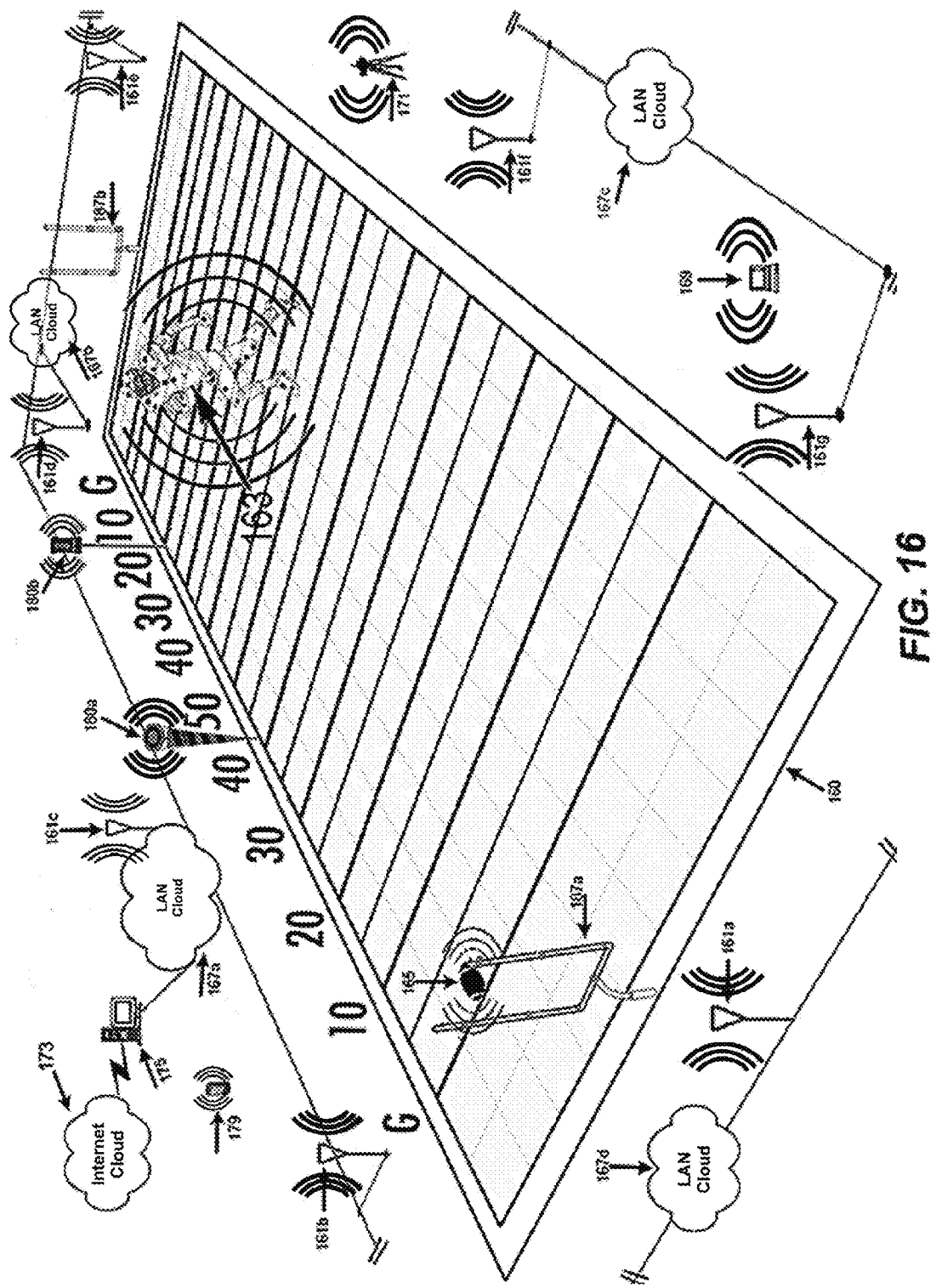

FIGS. 8A, 8B, and 8C are an exemplary display of sports statistical information, portions of which contain performance metrics and data which may be produced in accordance with one embodiment of the present invention;

FIGS. 9A, 9B, and 9C illustrate exemplary displays of sports statistical information, portions of which contain performance metrics and data which may be produced in accordance with one embodiment of the present invention;

FIGS. 10A and 10B illustrate exemplary displays of sports statistical information, portions of which contain performance metrics and data which may be produced by the present invention;

Figures 11A, 11B:
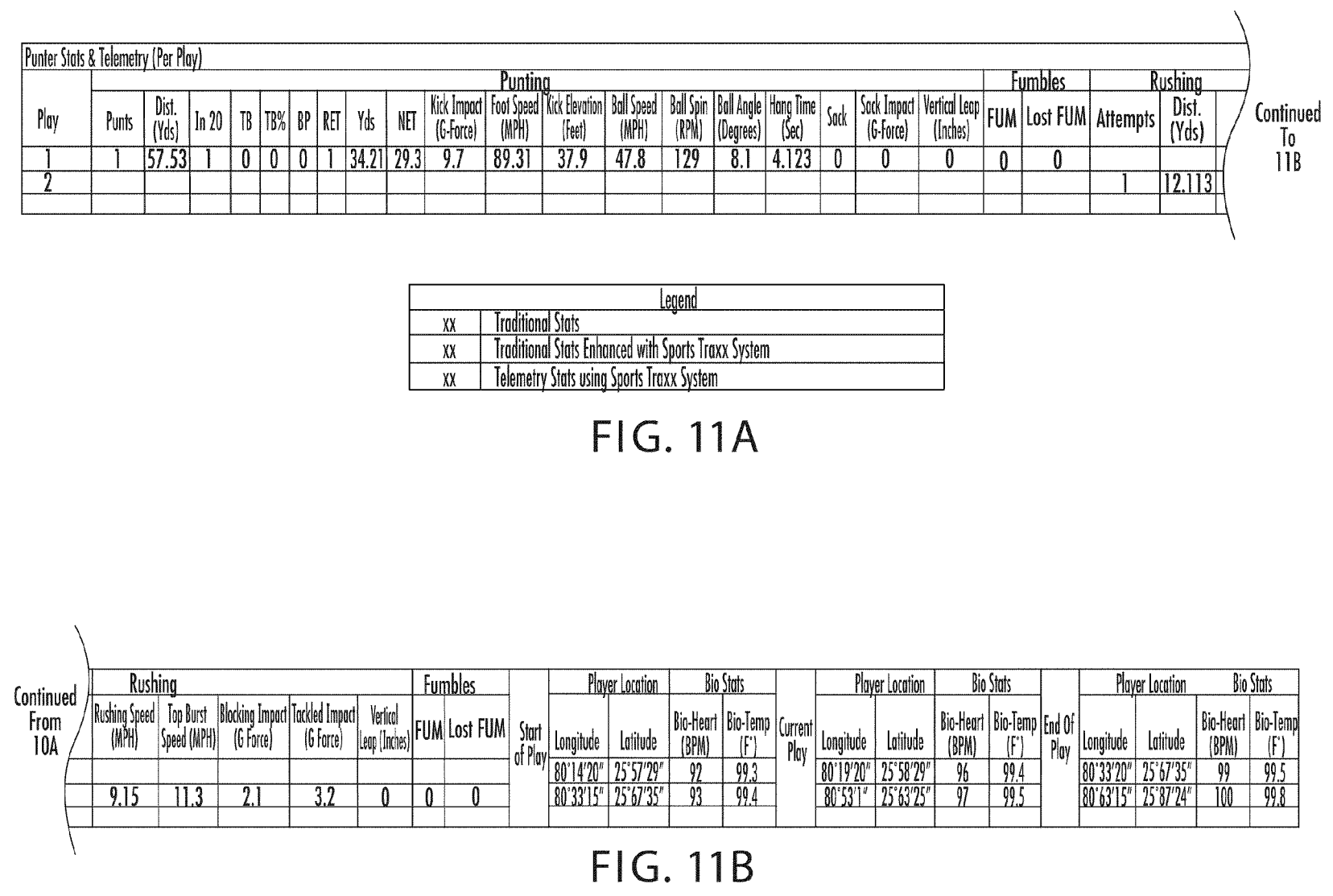

FIGS. 11A and 11B are an exemplary display of sports statistical information, portions of which contain performance metrics and data which may be produced in accordance with one embodiment of the present invention;

FIG. 12 is an exemplary display of sports statistical information, portions of which contain performance metrics and data which may be produced in accordance with one embodiment of the present invention;

FIG. 13 is an isometric view of a section of a field of play illustrating game location tags in accordance with one embodiment of the present invention;

FIG. 14 is an isometric view of a field goal post being an exemplary embodiment illustrating game component monitoring tags in accordance with one embodiment of the present invention;

FIG. 15 is an isometric view of an exemplary embodiment integrating video with real time telemetry data in accordance with one embodiment of the present invention; and FIG. 16 illustrates a simplified view of a sports real-time locating and sensing system in accordance with one embodiment of the present invention.

DETAILED DESCRIPTION OF THE PREFERRED EMBODIMENTS

Shown throughout the drawings, the present invention is generally directed to a method for acquiring, collecting, processing, exporting and recording sports performance metrics data and statistics, during an actual sporting event in Real-Time. The method includes attaching sensor modules and telemetry modules on movable sources. These sources may include individual sports events participants, participants of an entire team, both teams, game officials (referees), field of play and sports objects. Sports objects may include a football, a baseball, a hockey puck and other movable objects employed in sports events or competition. The sensor modules may include sensors for measuring performance data and location. For example, the sensor modules may measure heart rate, temperature, acceleration, etc. The location data may include coordinates to indicate player position, for example. A telemetry module may include an identifying device (e.g., RF ID tags or the like). In some embodiments the telemetry modules may integrate sensors.

Identifying devices may be used to identify a specific individual participant, participants of an entire team, both teams, game officials (referees), field of play and/or game object(s). Measuring devices acquire and collect performance metrics and data in real-time. The collected data can be transmitted via a wireless link to a base computer system having data collection software. Telemetry modules facilitates the transmission to at least one receiver, connected to the base computer, of the data measured at moving sources on a playing field 10. It is to be understood that the sources and playing field 10 is described generally and the method may be incorporated into any sports event.

The acquired real-time performance metrics, data and statistics received by the base computer system can be used instantly in real-time for sideline evaluation and analysis by further transmitting the processed data to end user devices. The end user devices may include computers (fixed or portable), tablets, PDAs, mobile technologies, etc. The processing by the base computer system may produce superimposed and/or integrated telemetry data onto the live video broadcast, or incorporated into instant replays of the live game, practice, training and sporting event. Also, the telemetry data processed by the base computer may be used as sports statistics, as metrics in the context of Fantasy Sports; may be directly transmitted to fans at the stadium or homes, websites, computers, PDAs, and other mobile technologies; or may be exported and used by electronic video sports games to replay and simulate player game performances. The end user devices may be configured to continuously track the location, on the playing field 10, of each source, to receive data from measuring devices, and to associate the data with the originating source.

In an alternative embodiment, end user devices may receive the telemetry data directly from the telemetry module or through a network connection that streams the telemetry data to the end user devices, so that the processing of the telemetry data is conducted locally at the end user device. The data processed at the end user devices may be exported.

The system of the present invention may present the performance metric, data and statistics and other data via RF wireless applications in a mobile device, for example, Performance metrics and data can be played back at a later time and superimposed and/or integrated onto video for "Film Study" sessions by teams, coaches, players and scouts to objectively and quantitatively analyze data related to plays, player speed, velocity, speed burst, forward, backward, horizontal & vertical movement, location, and athletic performance. Alternately, the overlaid or superimposed information may be used by and referenced for sportscasters and sports analysts. The performance metrics, data and statistics acquired and captured by the system can be exported and/or recorded into standard relational databases, such as an SQL Server or other formats, or can be exported in real-time to reports, video, encoding, superimposing and/or integration and represented visual graphs. The following is an example of the performance metrics, data and statistics for American Football which may be provided by the present invention in real-time:

| Player | Ball | Officials or Referees |
|---|---|---|
| Field location | Velocity | Ball Spotting and Marking |
| Tracking of horizontal/vertical movements | Pass speed | Player and Ball Field location |
| Game speed | Rotation | Field measurements |
| Burst speed | Impact (G-Force) | First down |
| Burst to ball | Height | Touchdown |
| Burst to gap | Angle | Fumbles |
| Impact | | Referee To Play Positioning |
| Tackle and blocking impact (G-force) | | Angle to ball |
| Yards after impact | | Angle to player |
| Speed after impact | | Play Perspective |
| Lateral and vertical speed | | Penalty Calling |
| Vertical leap height | | Ball Marking |
| Biological information | | Tracking of horizontal/vertical movements |
| Heart rate | | Game speed |
| Body temperature | | Lateral and vertical speed |
| | | Biological information |
| | | Heart rate |
| | | Body temperature |

In one embodiment of the present invention, radio frequency (RF) devices such as tags, sensors and/or chips may serve as the identifying devices. Each source may carry a fixed radio frequency chip encoded with identifying data which may be correlated to the individual participants, parts or objects. The Sports telemetry system of the present invention may include a Real-Time Location System (RTLS) and Real-Time Sensing System (RTSS) with RF technology. The RF technology may include active and/or passive RFID tags and an RF wireless array system as a receiver. The RF technology in the RTLS and RTSS may include UWB technology (e.g., IEEE 802.15), WLAN technology (e.g., IEEE 802.11), SAW RFID positioning system technology, GPS Technology, etc. The sensors and/or tags may communicate directly with each other and/or relay telemetry data directly to base receiving RF device(s) or base receivers. The base receivers may forward the telemetry data to a base computer either through a direct link or through a network. Alternatively the telemetry data may be forwarded to end user devices, such as laptops, mobile devices, etc., either directly or through a network.

RF electronic directional signaling devices, positioned at multiple locations proximate to the playing field 10 may be used to locate the RF tags, sensors and/or chips by triangulation. A planar (three dimensional) x-y-z location, for each source may be delivered to the receiving means and handled as set forth above.

A comprehensive system using RF technologies such as UWB, ZigBee, Wi-Fi, GPS data system can be utilized as described above. The playing field 10 can be mapped via RF technologies, such as UWB, ZigBee, Wi-Fi, 802.11 and/or GPS coordinates. Further, a spatial (three-dimensional) x, y, z data acquisition system can be utilized for obtaining telemetry data (e.g., spatial, performance) for the players, sports officials, field of play, sports objects as playing pieces, and the like.

Each tag's physical location on the game field 10 can be determined using a variety of means. One such means is using common RTLS with UWB technology. Other means include integrating multiple RF technologies such as ZigBee, 802.11, GPS technology, triangulation, and the like with UWB, for example. Two (four for 3D) or more RF readers/antennae in a RF base array can precisely determine the RFID tag's range from each reader and its location using RTLS in Real-Time. The readers/antennae may be interconnected using a LAN, such as Ethernet to provide a network communication infrastructure for the computers and servers. Active and passive RFID Tags may be employed. The active tags (RFID) may have a two-way communication function, which allows the base computer system to dynamically manage the tags; vary update rates; and send self-identification and telemetry data.

The active tags may employ dual-radio architecture. In one embodiment, active tags transmit radio pulses, which are used to determine precise two-dimensional or three-dimensional location and a conventional bi-directional radio, which is used as a control and telemetry channel with a tag update rate. The tag, sensors and/or chips may have intercommunication with each other to relay information to themselves and the receiving system.

Continuing with the telemetry system, tags and sensing devices may be disposed upon the participants as well as various game objects. In the exemplary embodiment, multiple tags/sensors could be embedded, attached and/or affixed in the participants equipment, including shoulder pads, chest pads, helmets, shoes, and the like, as well as game objects 68, including a football, sideline markers, down markers 80, and the like. Data, such as movement, location, speed, acceleration, burst, impact, location and the like, can be acquired, captured and provided to the system. Each grouping of multiple embedded sensors can be configured into a single logical entity that may be disseminated by the base receiving system. The receiving system and network can include an identification reference, including performance and reference information for each individual sensor and location.

The sensor modules may be in signal communication with the telemetry modules via either a wired or a wireless interface. The data handling means and the telemetry means may be operated to acquire, collect, store and export performance metrics, data and statistics and deliver the data to the end user devices or equipment such as video telecast equipment for super-imposing the performance metrics and data, sideline mobile devices, Sports Leagues, Internet, websites, Fantasy Football, etc.

One or more base receivers may be connected via RF or electronically connected to the base computer system, which may in turn process the telemetry data for forwarding to end user devices. The performance metrics, data and statistics captured by the system can be recorded into standard relational databases SQL Server, and/or other formats and can be exported in real-time to reports, video, for superimposing and/or integration into video, or as represented graphs of sports performance metrics, data and statistics. The base computer may be operated to receive, store, export and process the sports data for providing performance metrics, data and statistics information relating to Real-time Location System based tracking, movement, relative position, and conditions of individual sports participants, the entire teams, and sports field of play and sports objects.

The Sports RTLS/RTSS RF Telemetry and base computer system of the present invention can be programmed and configured to receive the stream of performance metrics, data and statistics to transmit and store the data retaining periodic time stamps and identify RF tags. The base computer can be further programmed and configured to sort and present the data according selected mode and criteria. For example, the computer may be adapted to display a series of location data points, for each source, indicating the progressive movement (tracking) of each source, by a colored line on the display thereby graphically tracking movement, speed and other metrics. In this manner, the course of movement of each individual participant and/or a game object (ball) may be graphically displayed. Turning to the example of football, the method of the present invention may display the course of action in a particular football play, as a visual aid for teams, coaching or players, and for Fantasy Sports, Websites, electronic video displays, and Fans, sports analysts, sports, commercial and entertainment uses. Fantasy Sports team owners and others a unique perspective from different angles with insightful, unique and invaluable information. Images may be employed to display a three dimensional dynamic view of players on a playing field. The data may also be utilized to form profiles of particular players, for leagues, teams, coaching, Fantasy Sports, electronic video games, websites, mobile devices, etc.

Figure 1:
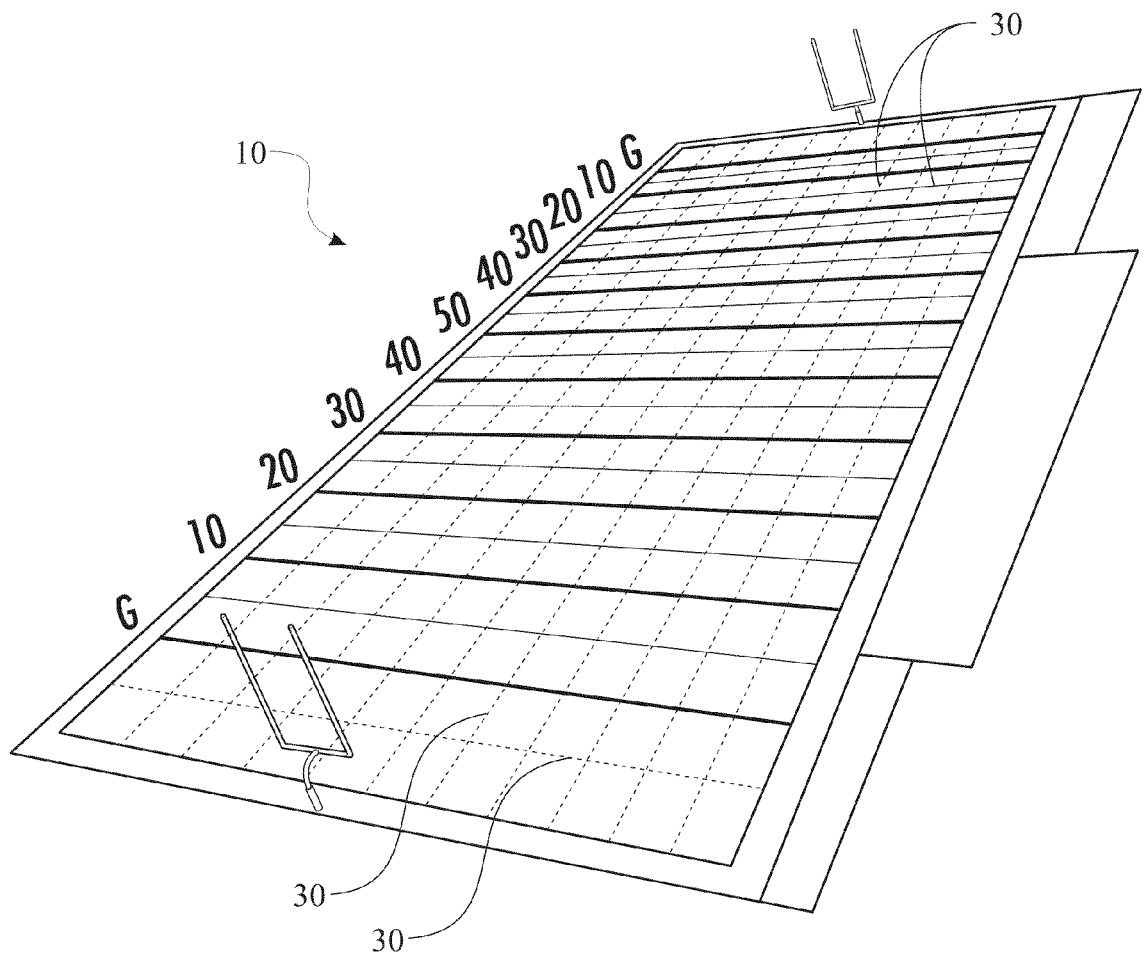
FIG. 1 is a diagram of an American football playing field with a recognition wireless coverage area grid indicated by dotted lines representing an area of coverage using a wireless array, in accordance with one embodiment of the present invention.
Figure 2:
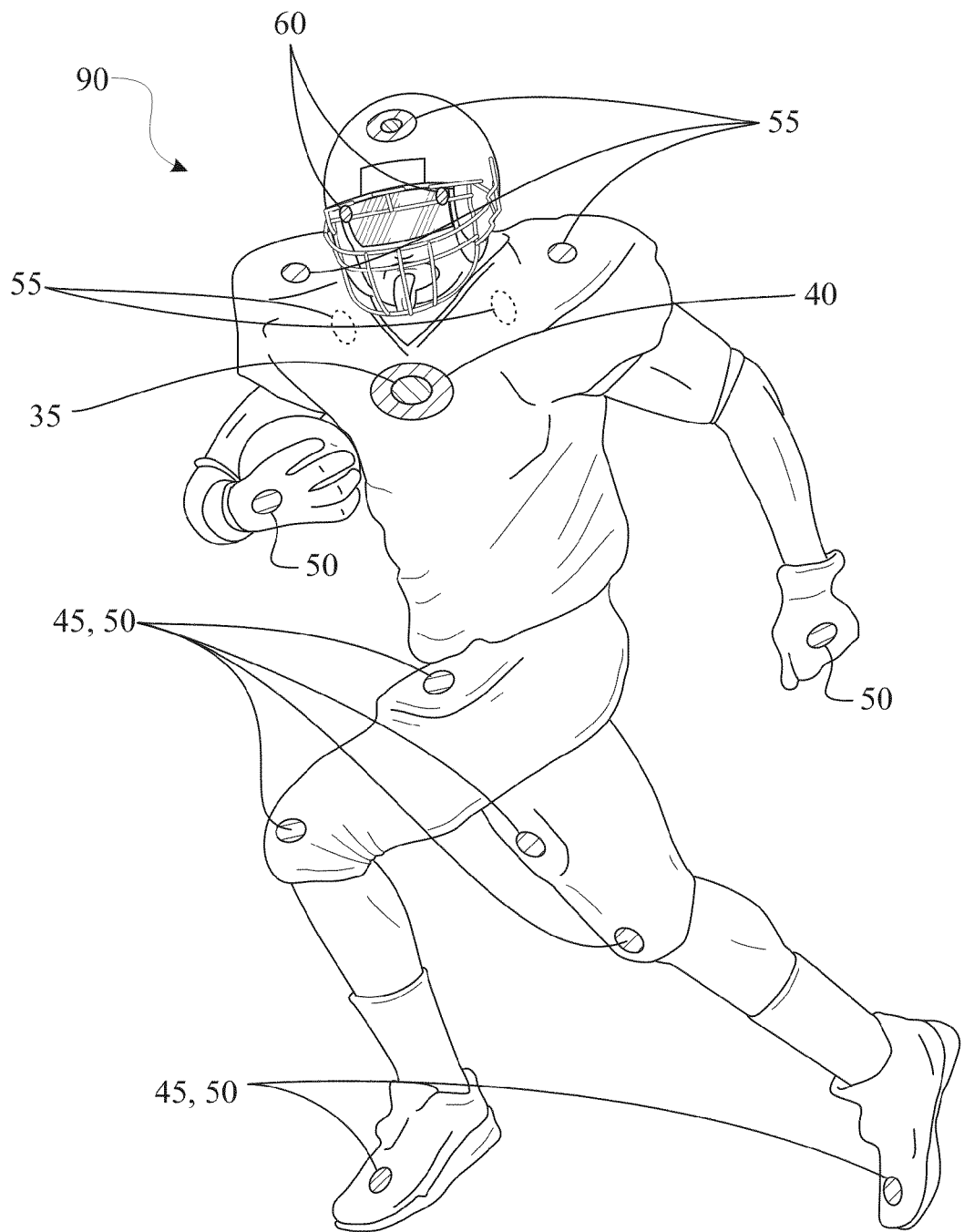
FIG. 2 is a drawing of an equipped American football player with various exemplary data handling and telemetry devices fixed to the equipment, in accordance with one embodiment of the present invention.

Measuring devices or sensor modules, as shown in FIG. 2, may include RTSS devices with a heart rate monitor 35, a body temperature probe 40, a conventional pedometer 45, a conventional accelerometer 50, and a conventional impact sensor 55 and camera 60. Alternatively, multifunctional sensors which can perform all the aforementioned functions of RTSS, may be attached or embedded. In one embodiment, each of the sensor modules may connect electronically and/or RF to the telemetry module.

FIG. 2 shows a heart rate monitor 35 and temperature probe 40 on the chest of a football player, a pedometer 45 and an accelerometer 50 of the feet, shoes and legs of the football player, impact sensor 55 on the helmet, shoulder pads (top, front, and rear), and thigh pads, and a camera 60 on the helmet. The present invention may have one or more of the measuring devices as depicted or multiple measuring devices in multiple locations for better sensory acquisition, distribution and redundancy of sensory or telemetry devices. It will be appreciated that each measuring device may include a telemetry device (or vice versa) of each measuring device may be connected to a shared telemetry device. In one embodiment, the telemetry device or devices transmit a time stamped data stream tagged with a source identity, to the base receiver(s). The base receivers are preferably configured to deliver the data stream to the computer system. The camera 60 may provide streaming video of the view from the helmet of the player.

The player video system may include a video eye-tracking system that can provide a view of the player's field of view as well as the player's eyes and movement. The eye-tracking camera(s) may be located in front center of the helmet. The player eye-tracking system will give a coach and fans the visual perspective of what the player is actually seeing. It is understood the eye tracking system can be incorporated into the RTLS/RSS system to integrate the sports participant's view with the real-time performance metrics and data, by for example, use of a multiplexer. The monitoring devices can be individually incorporated or at least a portion of the sensors being integrated into a single sensing device with multiple functions in multiple areas as desired.

The eye tracking system may include two RF/wireless video cameras. One camera may face the player's eye to track sports participant's eye and its movement. This camera may include a small RF/wireless video camera on the inside of the facemask near the forehead facing the player's eyes. The other camera(s) may point in the direction of the players field of view to capture at what he looks at and may include two small RF/wireless video cameras recessed on the inside of the helmet or facemask facing forward towards the sports participant's field of view. The eye tracking system may include one or more of the eye tracking camera products offered by Applied Science Laboratories, for example.

Figure 3:
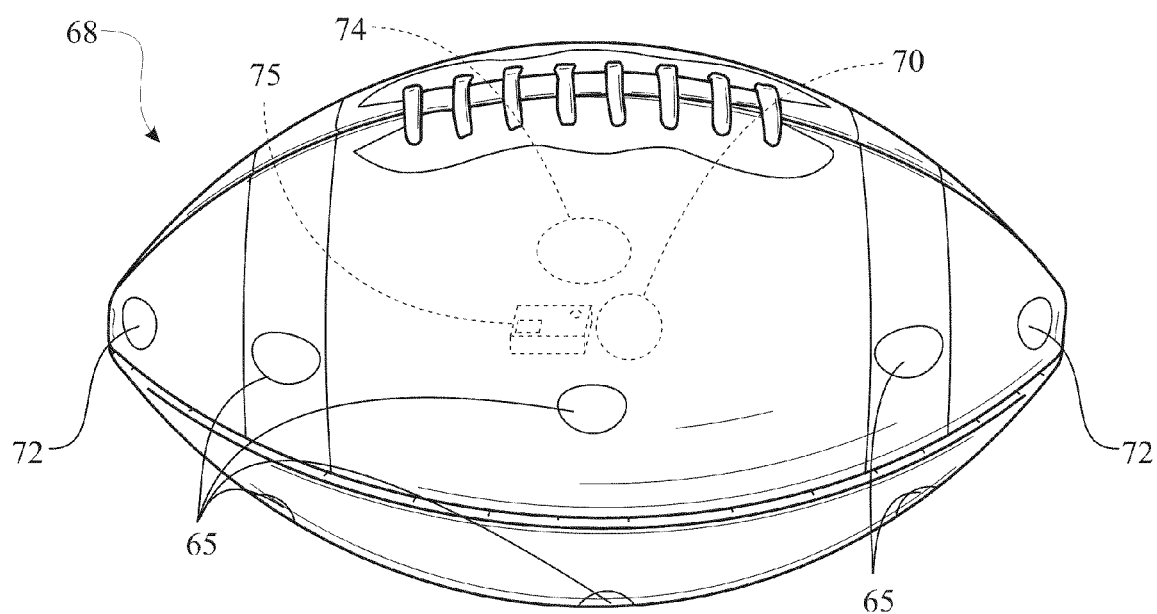
FIG. 3 is a drawing of an American football including various sensors and telemetry devices, in accordance with one embodiment of the present invention.

As indicated, sources may comprise an individual sports event participant, the participants of an entire team, both teams, field of play and/or a game object. FIG. 3 depicts an exemplary game object, namely a football. FIG. 3 illustrates multiple identity devices, in the form of location sensors 65 (such as UWB tags/sensors, RF, wireless, GPS sensors, and the like), a gyro sensor 70, an impact sensor 72, a transmitter 75, and an RF tag 74. The football may be provided with multiple identity devices to ensure proper tracking recognition during movement involving relatively high speed, rotation and relatively great displacement from the playing field 10, both of which are common occurrences. The current invention adds greater accuracy to marking the game ball, sports participants, location, speed and traveled area. It is understood the monitoring devices can also be individually incorporated or at least a portion of the sensors being integrated into a single sensing device with multiple functions in multiple areas as desired.

The base computer system can be programmed and configured to receive the stream of telemetry data and to store and export the data retaining periodic time stamps and identify tags. The computer can be further programmed and configured to sort and present the data according selected mode and criteria. For example, the computer may be adapted to display a series of location data points, for each source, indicating and tracking the progressive movement of each source in real-time, by a colored line on the display. In this manner, the course of movement of each individual participant, multiple participants and a ball may be displayed in relation to a field location. Turning to the example of football, the method of the present invention may display the course of action in a particular football play, as a visual aid for coaching, sports, or for fan entertainment. This may also include commercial, entertainment and historical value. Conventional software may be employed to display a three dimensional dynamic view of players on a playing field 10 or for producing reports. The performance metrics and data may also be utilized to form profiles of particular players, for fantasy sports, sports leagues, teams, coaching, player, film study, websites, Internet and sports entertainment and commercial purposes.

Figure 4:
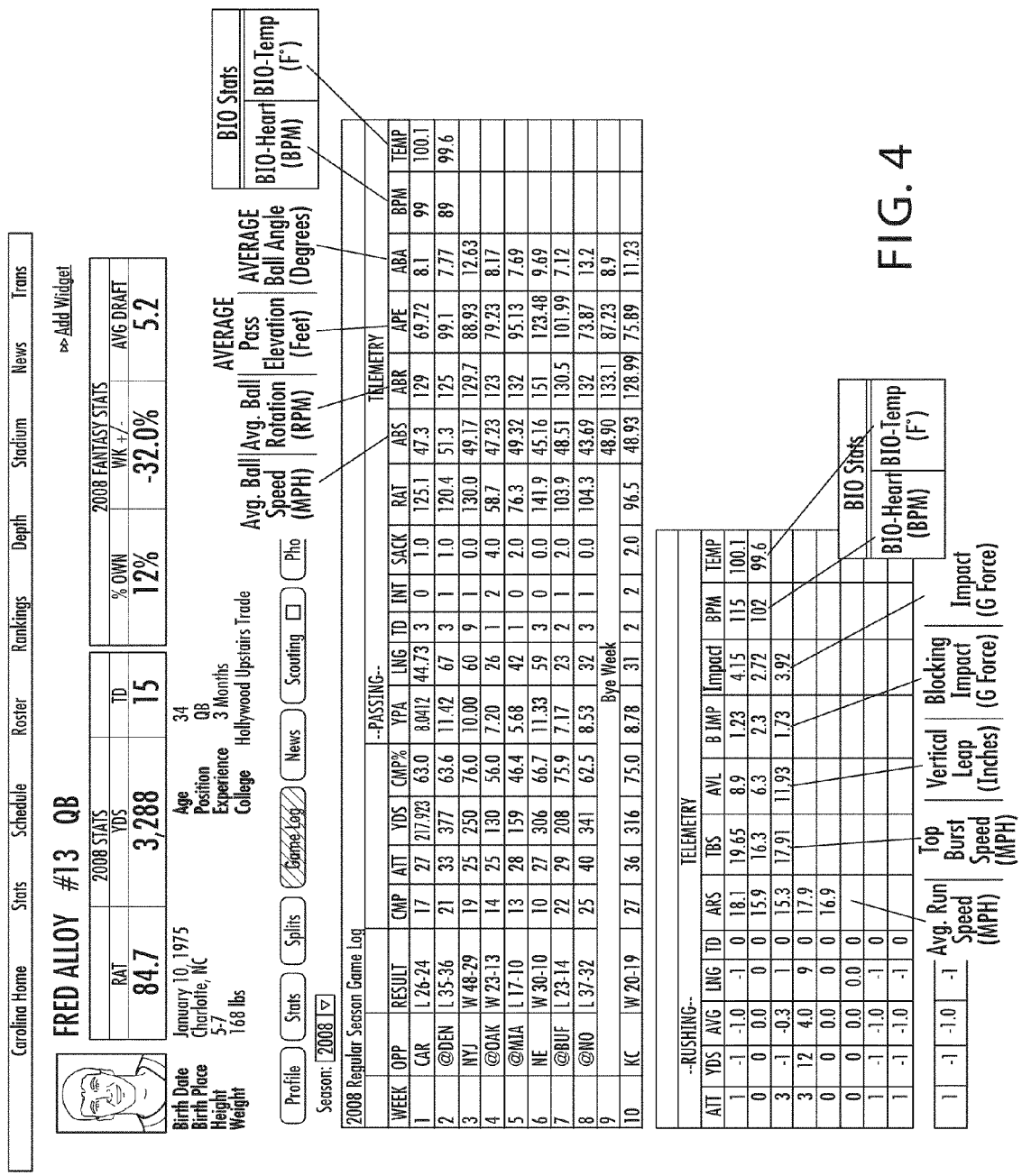
FIG. 4 is an exemplary statistical report displaying representative data combining sports record statistics, including performance metrics, in accordance with one embodiment of the present invention.

Stored and/or exported data may be presented in visual, report or chart form, as depicted in FIG. 4, which combines conventional football game performance metrics, data and statistics with data provided by the method of the present invention. The exemplary displayed data is selected from one source, namely an individual participant named Fred Alloy. The rows each represent statistics and data collected during a particular week. The columns extending from left to right report conventional passing statistics and the far left columns display data that may be collected by the application of the method of the present invention. In the exemplary embodiment, the column labeled ABS reports the average speed of the ball, taken from the series of location data points identified for the ball, during actual play. The column labeled ABR reflects ball rotation derived from output of the gyro sensor 70. The column labeled APE reports pass elevation. In addition, new columns may be created to show actual speed, burst, impact and other metrics. The column labeled ABA reports average ball angle, BPM reports participant's heart rate, and TEMP reports body temperature. Stored and/or exported data may also be presented in visual or report form.

Likewise, the lower section of the chart reports rushing statistics, with conventional statistics in the left five columns and data derived from the method of the present invention displayed in the columns on the right. The column labeled ARS reports average run speed. The column labeled TBS reports top burst speed. The column labeled AVL reports vertical leap. The column labeled B IMP reports blocking impact. The column labeled IMPACT reports intensity of impact. The column labeled BPM reports heart rate. The column labeled TEMP reports body temperature. Columns may be created to show actual and precise speed, burst, impact and other metrics.

Figure 5:
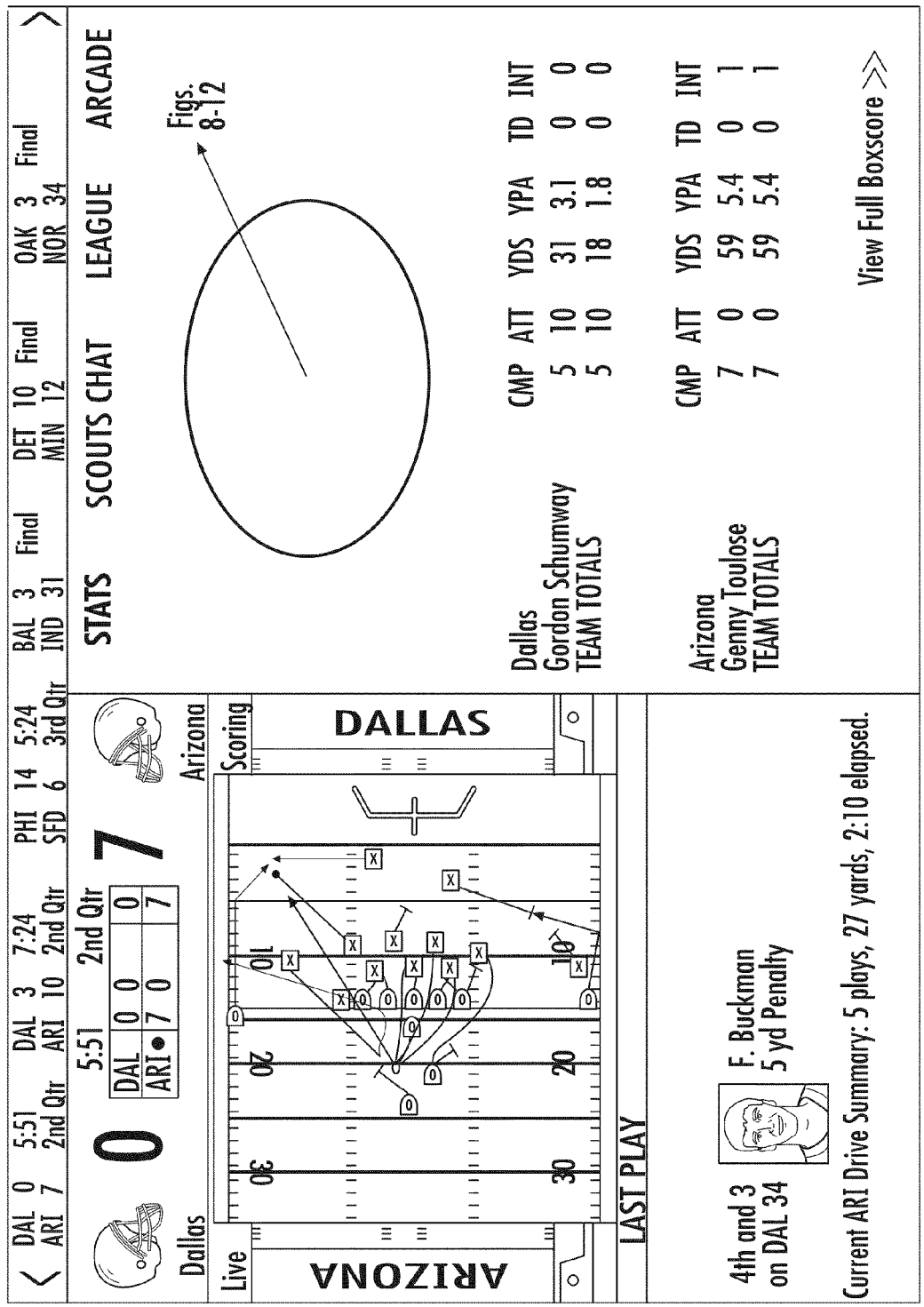
FIG. 5 is an exemplary representation of a contemporaneous Internet based sports event status display indicating an area for presentation of video output in Real-time in accordance with one embodiment of the present invention.
Figure 6:
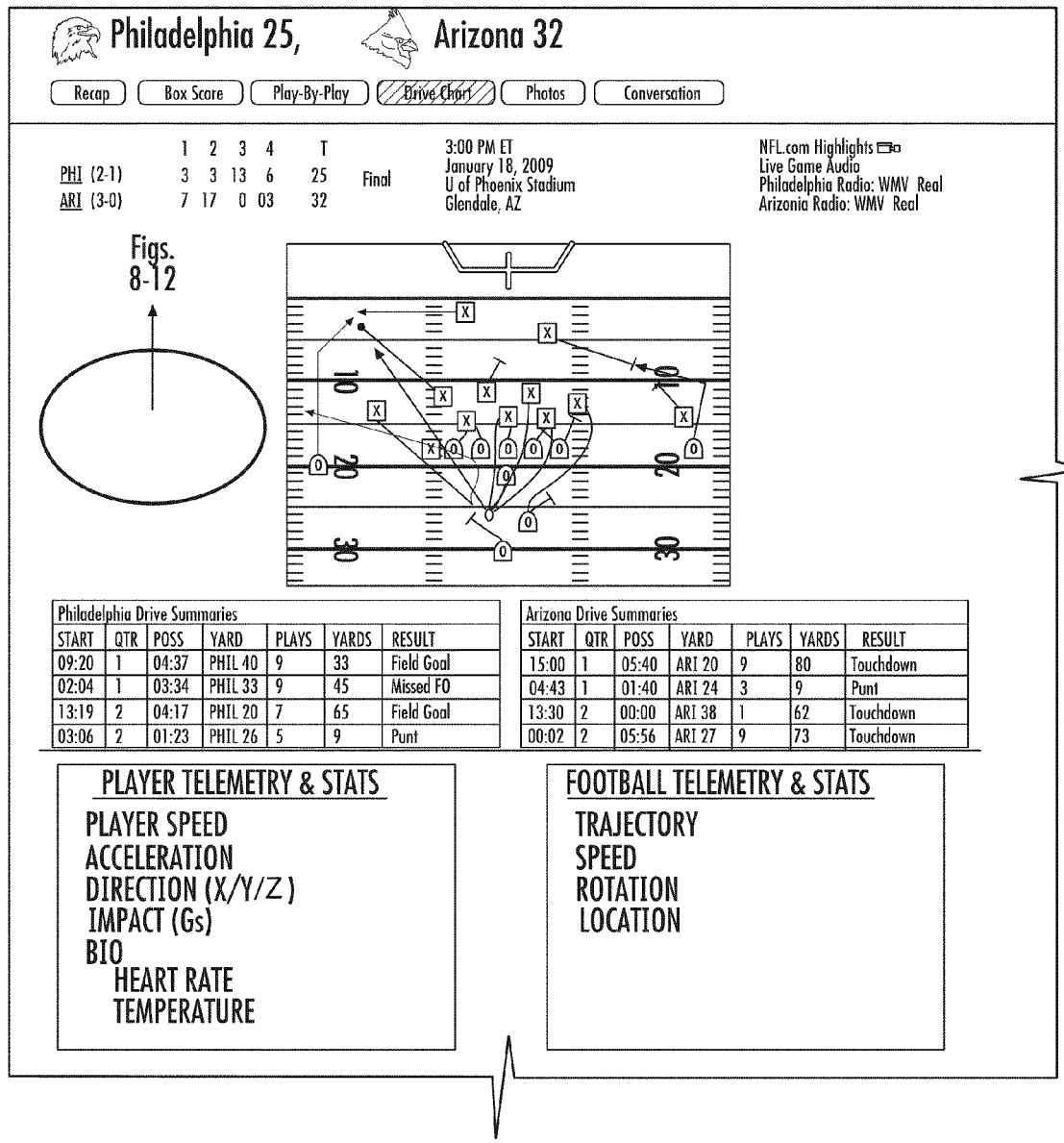
FIG. 6 is an alternative representation of a contemporaneous Internet based sports event status display indicating an area for presentation of video output in Real-time in accordance with one embodiment of the present invention.

The data, which is collected, processed, and presented, according to the method of the present invention, may be utilized as the basis for player profiles and play scenarios in live game and post game analysis by leagues, teams, coaches, TV broadcasting, fantasy sports, and the like. FIG. 5 shows an exemplary display screen 501, which may appear on a computer in fantasy game play. A band, on the upper portion of the screen, displays scores of league football games. The left portion of the screen includes a depiction of a football field with players designated and routes of movement indicated by path lines. The right portion of the screen includes an ellipse to indicate an area for displaying performance metrics, data and statistics generated according to the method of the present invention. A similar screen 601 is depicted in FIG. 6 having an ellipse, in the left portion to indicate an area for display of performance metrics, data and statistics generated according to the method of the present invention.

Figure 7:
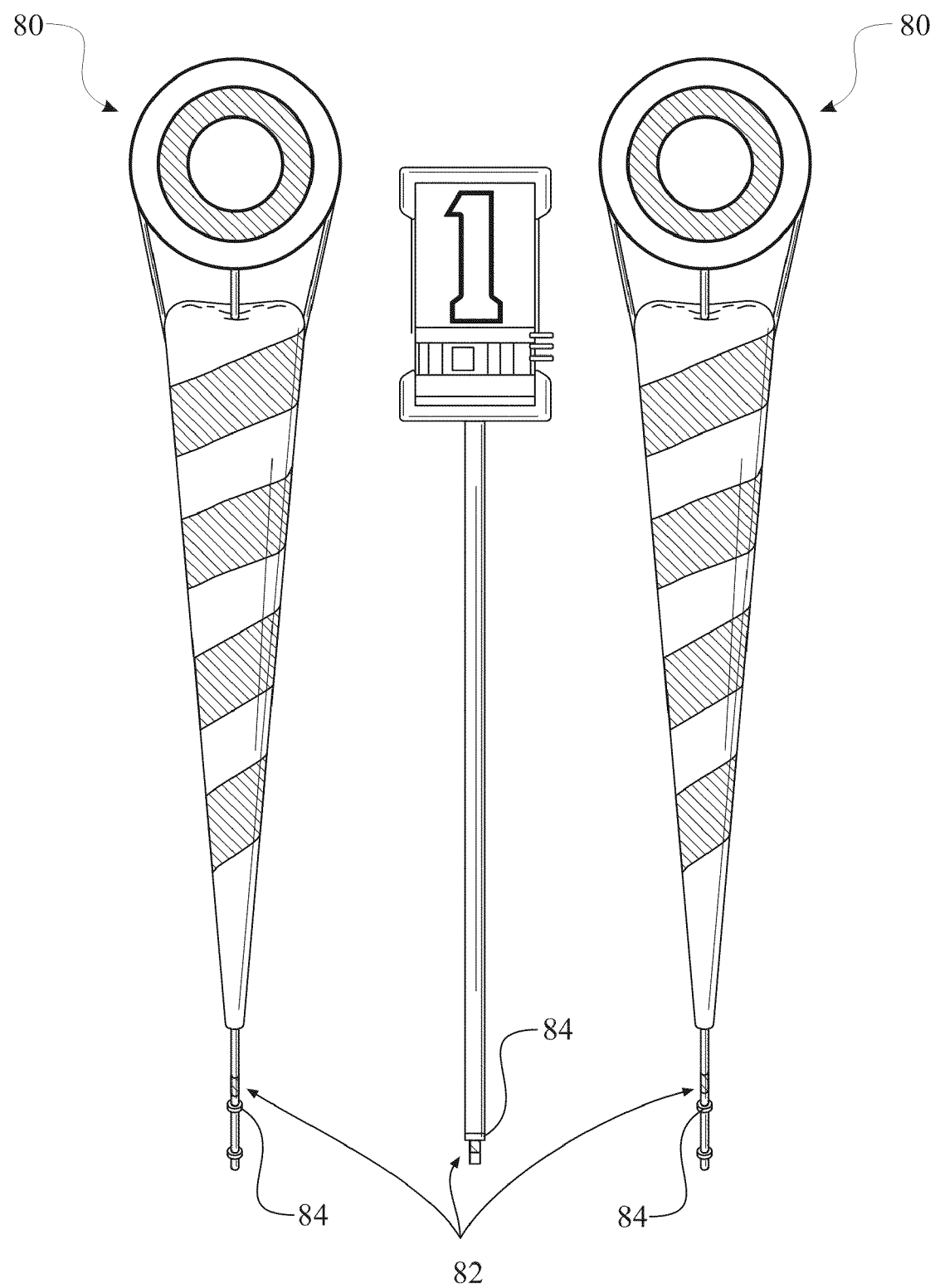
FIG. 7 is a drawing of down marking equipment, for an American football game indicating the fixing of data handling and telemetry devices in accordance with one embodiment of the present invention.

The method of the present invention may also include object sources other than the ball or other projectile used in play. FIG. 7 shows a set of football down markers 80 with identification devices, such as RF (radio frequency) tags/sensors/chips 82 fixed on the objects. The down markers 80 can include a telemetry sensor 84 for identifying the location of the markers 80. It will be appreciated that the receiving means may include means to locate the radio frequency chips by triangulation and that each chip preferably includes encoded identification data, which may be communicated to the receiver and input to the computer, as a tag on the location data. The processing may include comparing the ball location to the down markers 80 and completion of an arithmetic operation to compute and report the distance required to reach a first down, in a football game. Additional data devices can be incorporated such as an identifier recognizing the down (or similar reference), and the like.

It will be appreciated that the technique may be incorporated into other sports to provide data for computing relevant parameters. The method of the present invention may be readily adapted for use other sports such as hockey, baseball, basketball, or golf, for example.

In addition, the method of the present invention may serve industrial applications where continuous monitoring of location and movement for individuals and objects is required.

FIGS. 8A, 8B, and 8C show three segments of an elongate chart intended to be read as a group of linear rows of data showing data, in columns, for each row.

The data pertains to a football quarterback and each row of data represents a single play and illustrates the variety of data, which may be collected and presented using the system and method of the present invention. Similarly, FIGS. 9A, 9B, and 9C show three segments of an elongate chart intended to be read as a group of linear rows of data showing data, in columns, for each row. The data pertains to a football wide receiver. FIGS. 10A and 10B illustrate data pertaining to a football defensive player. FIGS. 11A and 11B illustrate data pertaining to a football punter Like data can be collected for other players and may be presented in a similar manner. Additional data can be provided with the incorporation of respective sensing and telemetry devices. FIG. 12 illustrates a printed display of the data received from the object sources comprising the down marker equipment 80.

A portioned view of the playing field 10 is presented in FIG. 13, illustrating an exemplary inclusion of field deployed tags 154. These sensors accurately determine if a ball crosses the goal line, first down, goal posts and field position, for example.

In the illustration, a pair of goal line markers 150 is positioned at each sideline to goal line intersection. The goal line marker 150 includes at least one line tags 154 sensing a position of a player 90, a game piece 68, game officials/referees (not shown) and the like. The placement of two or more tag sensing posts 150, 152 is arranged to additionally monitor the sidelines as well as the respective yard markers, goal line, and end zone. Other reference sensors can be integrated into various equipment associated with the game or playing field 10, such as a goal post assembly 100 (FIG. 14) and sideline markers 80.

The goal post assembly 100 may be formed having a goal post support 102, which supports a goal post horizontal member 104, which in turn supports a pair of spaced goal post uprights 106 as detailed in FIG. 14. It is understood the shape of the goal post assembly 100 can vary. The goal post assembly 100 can include a series of tags being positioned at various locations on the goal post assembly 100. A first tag is referred to as a base central tag 110, being located proximate a center of the goal post horizontal member 104. A pair of tags, referred to as goal post corner tags 112, may be integrated into the goal post assembly 100, each goal post corner tags 112 being located proximate an intersection formed between the goal post horizontal member 104 and each goal post upright 106. Additional tags can be integrated between the base central tag 110 and each goal post corner tags 112. A goal post upright lower tags 114 and a goal post upright upper tags 116 can be added to the goal post upright 106, wherein the goal post upright lower tags 114 is located along a lower portion of the goal post upright 106 and the goal post upright upper tags 116 is located along an upper portion of the goal post upright 106.

The Sports telemetry RTLS/RTSS RF System can include a video aspect being synchronized to the telemetry data described above, wherein an exemplary embodiment is presented in FIG. 15. The Sports telemetry RTLS/RTSS RF system of the present invention may transmit real-time game or practice sports player(s) performance metrics, sports and game object metrics, game official performance metrics and "Field of Play" data 10 to a video component. After receipt of the telemetry data, the data may be processed so that it can be synchronized, integrated and/or superimposed onto to the live video telecast feed from with the real-time metrics to the live video telecast feed from video camera(s) recording the sports event. The telemetry data may be used as part of a 360-degree dynamic view based on the camera angles and perspective relative to the acquired sports player(s) performance metrics, sports and game object metrics, game official performance metrics and "Field of Play" 10. The video and telemetry data can include markers to aid in synchronizing the two components. The system's acquired RF performance metrics, data and statistics may be integrated with the live video or recorded feed via various methods. One method includes transmitting the sports player(s) performance metrics, sports and game object metrics, game official performance metrics and "Field of Play" 10 directly to the live video feed network from the Sports telemetry RTLS/RTSS system for instant use on the live telecast to superimpose the performance metrics, data and statistics. A second method is to use a device such a Multiplexer (MUX) or encoder used with the telemetry system to encode the player's field of view data with other acquired metrics data to provide a 360 degree dynamic view based on the camera angle and perspective relative to the sports player(s) performance metrics, sports and game object metrics, game official performance metrics and "Field of Play" 10.

In the exemplary embodiment, a monitored player 90 is shown in motion on the "Field of Play" 10 at an end-user display or base computer display, for example. Data points (referenced as A through F) are collected at a series of intervals taken along the player's route 95. The data collection points or intervals can be based upon any of a variety of instigators, such as time, impact, location, an event, and the like. The collected data can be presented in balloon styled information blocks 98 extending from the data collection point. Although the exemplary illustration presents a monitored player 90, it is understood the system can include a plurality of players, data referencing the game pieces 68, game markers 80, and the like. The video can be obtained in accordance with a horizontal orientation, thus incorporating a height (Z axis) component. The telemetry system of the present invention allows a 3D rendition and/or a 360 degree rendition of the sports participants, sports objects, field of play and sports components and their performance metrics, data and statistics from a variety of angles and perspectives.

The RF tags can provide a variety of information. The RTLS RFID Tags may be embedded in the equipment, attached, affixed to the apparel (snap, stitched, in pockets, and the like), or affixed to the athlete. The RTLS tags/sensors with RFID may be encased or embedded, as electronic chip with pressure-sensitive properties. The RTLS RFID tags and RTSS sensors include sensing functionality such as tracking, location & positioning, direction (forward/reverse/sideways), speed, burst and/or acceleration, velocity, impact (in G-Force), body temperature and heart rate to list a few. The body temperature and heart rate devices may be incorporated in RFID tags or other types of device sensors. In some embodiments the RTLS/RTSS sensors and tags can be embedded or affixed in the athletic shoes (soles, cleats, etc.) or strapped or taped and they will be able to allow the Sports telemetry RTLS/RTSS System to track players' footsteps and act as pedometers. The following list is an example of the possible multiple RTLS RFID tags placement that may be used for (American) Football on the player sports equipment, apparel and/or person, "Field of Play" 10 and sports objects:

A. Helmet
B. Shoulder pads (top, front & back)
C. Chest and back
D. Back Pad
E. Hands
F. Elbows
G. Thigh Pads
H. Knee Pads
I. Cleats/Shoes
J. Football (ball)
K. Yard Sticks (Scrimmage Line & First Down)
L. Yard Markers
M. Field Goal Posts
N. End Zone Markers
O. Practice Equipment
  1. Tackling dummies
  2. Blocking Sleds
  3. Blocking Pads FIG. 16 illustrates one embodiment of the present invention. FIG. 16 illustrates a playing field 160 for a sporting event such as football, a sports participant 163, such as a football player, and a sports object 165, such as a football. The sports participant 163 and the sports object 165 have telemetry modules affixed thereto, for example. Sensors and tags may also be deployed at down markers 180*a-b* and at goal posts 187*a-b* to detect and transmit telemetry data related to position of the ball, for example, with regards to the markers and posts.

The receivers 161*a-g* may be deployed at various locations in or around the field 160 for receiving telemetry data (e.g., performance metrics). In the illustrated embodiment, the received telemetry data is forwarded to a base computer system 169, for processing, through a local area network (LAN) cloud 167*a-d*. Artisans will recognize that the received telemetry data may be forwarded to the base computer system 169 through other communication means. On the illustrated embodiment, a camera 171 recording the sports event may transmit a live feed signal to the base computer system 169 through the LAN 167.

The base computer system 160 may process the telemetry data, for example, by generating additional performance metrics, superimposing the telemetry data with live video of the sports event, creating 3D images sequences of play, comparing the telemetry data with historical statistics, etc. The processed data may be forwarded or exported by the base computer system 169 to remote computer 175 over the Internet 173, for example, for display or further processing of the telemetry data and/or video signal. Likewise, the processed data may be forwarded or exported to end remote PDAs 179 over a wireless network for display or further processing of the telemetry data and/or video signal. Alternatively, the telemetry data and/the live video feed signal may be forwarded to PDA 179 (e.g., through a wireless network) and computer 175, bypassing the base computer system 169 (e.g., directly through a LAN 167*a*), for processing such as generating additional performance metrics, superimposing the telemetry data with live video of the sports event, creating 3D images sequences of play, comparing the telemetry data with historical statistics, etc. In yet another alternative embodiment the telemetry data is received by the camera 171 for real-time processing (e.g., superimposition of live video signal with telemetry data) and for transmission of the processed signal to the base computer system 169, for example. The data processed by the system of the present invention may be uploaded in a website for access by scouts, video game designers, fans, coaches, etc.

The present invention, explained through illustrative, non-limiting examples above provide many benefits. The Sports telemetry RTLS/RTSS system of the present invention adds a new, unique, and inside perspective of the game within the game to gain extensive knowledge and insight to sports, its players and components, for example. The Sports telemetry RTLS/RTSS system helps to quantify a player's training, practice, and game performance in an objective manner.

The Sports telemetry RTLS/RTSS system can be applied to all major sports such as Football (American), Hockey, Basketball, Baseball, and Soccer at all competitive levels including, but not limited to professional, college, high school, and private leagues (such as semi-pro). The Sports telemetry RTLS/RTSS system also applies to all major fantasy sports such Fantasy Football, Baseball, Basketball and Soccer. It may also be applied to other sports such as horse and dog racing and competitions.

The present invention directly benefits teams, coaches, scouts, agents, and fans who receive critical performance metrics, data and statistics to objectively quantify and analyze athletic performances and ability, thereby enhancing the appreciation of the player's athletic accomplishments with new historical perspectives. For example, potential player scouting and drafting are critical components of a team's future. Teams and coaches may also use the present invention to evaluate present and potential athletes, their performances, and plan game strategies based upon opponents, athletic abilities based on new performance metrics, data and statistics. Coaches can use the Real-time information to instant make analysis and adjustments from the sidelines or later with film-study sessions. The present invention is useful to safeguard team owner as well as the teams' investments with game new objective game and practice performance metrics, data and statistics.

The foregoing description of possible implementations consistent with the present invention does not represent a comprehensive list of all such implementations or all variations of the implementations described. The description of only some implementation should not be construed as an intent to exclude other implementations, Artisans will understand how to implement the invention in many other ways, using equivalents and alternatives that do not depart from the scope of the following claims. Moreover, unless indicated to the contrary in the preceding description, none of the components described in the implementations are essential to the invention.

What is claimed is:

1. A method for collecting sports data comprising the steps of:
   measuring, at one or more sensor modules mounted, affixed, or embedded on at least one sports participant, data corresponding to identification, movement, position, or condition of said at least one sports participant;

broadcasting, from one or more telemetry modules mounted, affixed, or embedded on said at least one sports participant, signals carrying said data corresponding to identification, movement, position, or condition of said at least one sports participant;

measuring, at one or more sensor modules mounted, affixed, or embedded in a sports object, data corresponding to identification, movement, position, or condition of said sports object;

broadcasting, from one or more telemetry modules mounted, affixed, or embedded on said sports object, signals carrying said data corresponding to identification, movement, position, or condition of said sports object;

receiving said signals from said telemetry modules mounted, affixed, or embedded on the at least one sports participant and the telemetry modules mounted, affixed, or embedded on the sports object; and processing the received signals to calculate position information or movement information of a sports object or a sports participant in relation to a playing surface of a sports event.

2. A method for collecting sports data comprising the steps of:

receiving, from one or more telemetry modules mounted, affixed, or embedded on at least one sports participant, first signals carrying data corresponding to identification, movement, position, or condition of said at least one sports participant;

receiving, from one or more telemetry modules mounted, affixed, or embedded in a sports object, second signals carrying data corresponding to identification, movement, position, or condition of said sports object; and processing the received first and second signals to calculate position information or movement information of the sports object or the sports participant in relation to a playing surface of a sports event.

3. The method of claim 2, wherein the steps of receiving first and second signals comprises receiving said first and second signals at least at three different locations.

4. The method of claim 3, wherein the step of processing the received first and second signals to calculate position or movement information comprises calculating signal phase information.

5. The method of claim 2, wherein the processing step comprises extracting global positioning information from said first and second signals.

6. The method of claim 2, further comprising processing the received first and second signals to calculate statistical data related to movement, relative position, and condition of the sports participant or the sports object.

7. The method of claim 6, wherein the step of processing the received first and second signals to calculate statistical data step is carried out in real-time during a sports event.

8. The method of step 2, wherein the processing step is carried out in real-time during a sports event.

9. The method of claim 2, further comprising displaying said calculated position information or said calculated movement information to indicate the progressive movement of the sports participant or the sports object.

10. The method of claim 9, wherein the step of displaying comprises displaying said progressive movement as a sequence of three-dimensional images.

11. The method of claim 2, wherein said sports event include a practice session.

12. The method of claim 2, wherein said condition comprises at least one of the following:
heart rate;
body temperature; or
impact.

13. The method of claim 2, wherein said sports participant includes a sports official.

14. The method of claim 2, wherein said first and second signals are received over a wireless communications link.

15. The method of claim 2, wherein said first signal further comprises performance metrics data.

16. The method of claim 15, further comprising:
receiving a live video signal from cameras recording the sports event;
processing said video signal to superimpose said performance metrics onto the video signal; and
displaying the video signal with the superimposed performance metrics.

17. The method of claim 15, wherein said performance metrics data comprises speed or burst data.

18. The method of claim 2, further comprising:
receiving, from one or more telemetry modules mounted, affixed, or embedded in an object placed in a location where the sports event takes place, third signals carrying data corresponding proximity of the sports object or sports participant to said object placed in a location where the sports event takes place.

19. A system for acquiring, determining and using performance metrics comprising:
a plurality of sensors configured to acquire a plurality of data corresponding to the performance of at least one sports participant, wherein at least a subset of the plurality of sensors is attached to the sports participant and equipment used by the sports participant;
a plurality of telemetry modules for communicating data acquired by the plurality of sensors to a remote processing module; and
a remote processing module configured to use the plurality of data to determine a plurality of performance metrics for the sports participant.

20. The system of claim 19 further comprising a user interface for interactively communicating the plurality of performance metrics to a plurality of system users.

21. The system of claim 20, wherein the plurality of performance metrics is communicated to the system users in real time.

22. The system of claim 19, wherein the plurality of sensors is at least one of biometric sensors, telemetry sensors, location sensors, and audiovisual sensors.

23. The system of claim 19, wherein the plurality of sensors includes at least one autonomous video camera for tracking sports participants and telemetry sensors.

24. The system of claim 19, further comprising communications modules for communicating the plurality of performance metrics in real-time to at least one of a server hosting a fantasy sports application, a broadcasting station or Internet websites.

25. A method for determining and using performance metrics comprising:
acquiring a plurality of data for at least one sports participant through a plurality of sensors mounted, affixed or embedded in equipment used by said sports participant, and mounted, affixed or embedded on at the at least one sports participant, said plurality of data corresponding to the performance of the at least one sports participant;
communicating the plurality of acquired data using a plurality of telemetry modules to a remote processing module; and
configuring the remote processing module to use the plurality of data to determine a plurality of performance metrics for the sports participant.

26. The method of claim 25 further comprising interactively communicating the plurality of performance metrics to a plurality of users using a user interface.

27. The method of claim 25, wherein the performance metrics are provided for live telecast of the sports participant.

28. The method of claim 25, wherein at least one of the performance metrics or the stored data is provided for use by sports modeling software applications.

29. The method of claim 28, wherein the software application is a software engine enabling multiple user interaction as part of a fantasy sports league, sports websites, or sports leagues.

30. The method of claim 29, wherein the fantasy sports league is a fantasy football league.

31. The method of claim 25, wherein at least one of the performance metrics or the stored data is provided for use by video games.

32. The method of claim 25, wherein at least one of the performance metrics or the acquired data is used in at least one of an analytical or a predictive analysis of the sports participant.

33. The method of claim 25, wherein the plurality of performance metrics are causally linked to a plurality of video signals captured through at least one of the sensors comprising a player and video camera, the plurality of telemetry sensors and video signals being tractable.

34. The method of claim 25, wherein the method is performed in real time.

* * * * *